United States Patent
Du Plessis et al.

[11] Patent Number: 5,289,992
[45] Date of Patent: Mar. 1, 1994

[54] FISHING REEL CONTROLLER

[76] Inventors: Jacobus C. Du Plessis, Silverpine Singel 10, Zwartkop, Ex. 4; Carl P. Du Plessis, Wentzel St 217, Wierdapark, Verwoerdburg, both of South Africa

[21] Appl. No.: 848,870

[22] Filed: Mar. 10, 1992

[30] Foreign Application Priority Data

Apr. 23, 1991 [ZA] South Africa ................ 91/3013
Aug. 22, 1991 [ZA] South Africa ................ 91/6635

[51] Int. Cl.⁵ ............................................ A01K 89/033
[52] U.S. Cl. ................................. 242/287; 242/294
[58] Field of Search ................. 242/287, 294, 323

[56] References Cited

U.S. PATENT DOCUMENTS

| | | | |
|---|---|---|---|
| 506,094 | 10/1893 | Boardman | 242/287 |
| 2,059,519 | 11/1936 | Harris | 242/287 |
| 2,261,610 | 11/1941 | Yarosz | 242/287 |
| 2,374,551 | 4/1945 | Margis | 242/287 |
| 2,527,131 | 10/1950 | Honeycutt | 242/287 |
| 2,546,776 | 3/1951 | Peterson | 242/294 |
| 2,672,302 | 3/1954 | Magee | 242/287 |
| 2,706,602 | 4/1955 | Spears | 242/287 |
| 2,725,201 | 11/1955 | Miller | 242/294 |
| 2,753,129 | 7/1956 | Martin | 242/287 |
| 3,670,985 | 6/1972 | Morishita | 242/294 |

FOREIGN PATENT DOCUMENTS

| | | |
|---|---|---|
| 66/5845 | 7/1967 | South Africa . |
| 68/7120 | 10/1969 | South Africa . |
| 71/6056 | 10/1972 | South Africa . |
| 75/1425 | 7/1975 | South Africa . |

*Primary Examiner*—Katherine Matecki
*Attorney, Agent, or Firm*—Jacobson, Price, Holman & Stern

[57] ABSTRACT

A mechanism for the automatic control of a fishing line on a rotating spool fishing reel in order to prevent over runs comprises a clip which can easily be clipped on to and off the reel, two cranks and a yoke. The cranks are pivotally mounted on the clip and are joined to the yoke, the inner ends of the cranks have brake pads in the forms of elastic bands stretched around small tabs which bear against the rim of the spool of the fishing reel in order to brake it if the fishing line is slack. When the fishing line tautens as in a cast it lifts the yoke in turn thereby lifting the brake shoes off the spool rim to allow it to rotate freely during the cast but as soon as the tackle and bait hit the water or for any other reason such as an uneven cast the line slackens allowing the yoke to drop and the brake shoes to come down on the spool rim and brake it to prevent an over run.

6 Claims, 3 Drawing Sheets

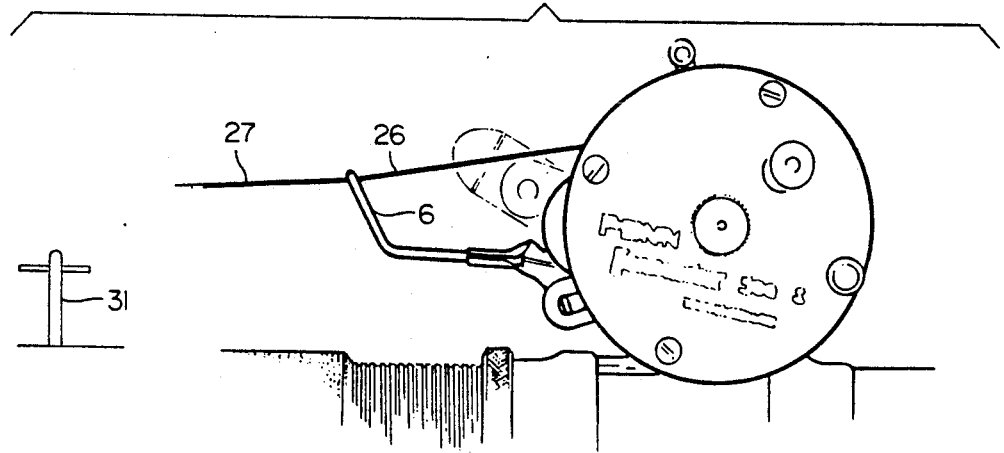
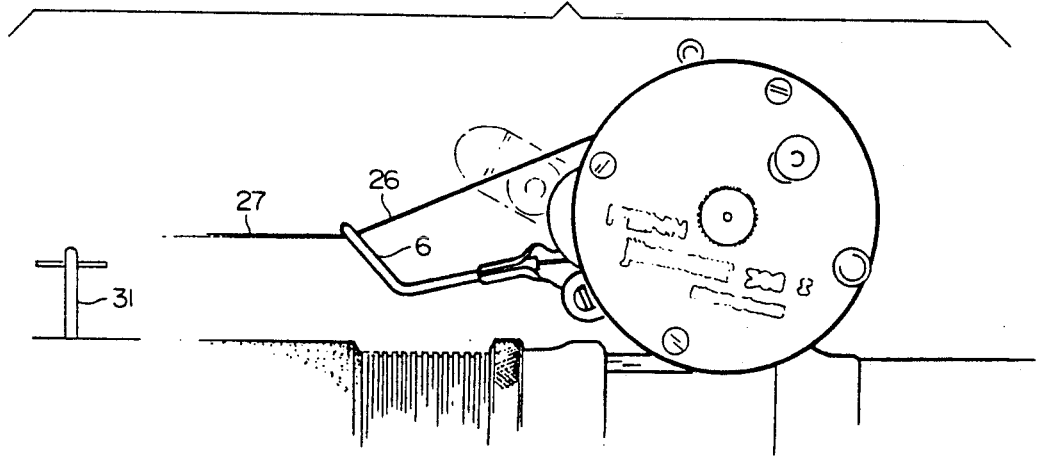
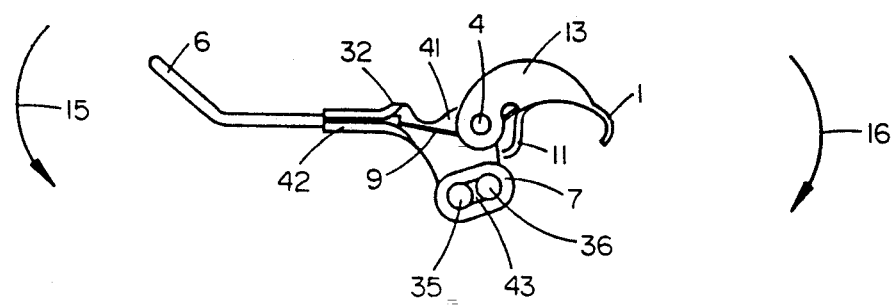

FISHING REEL CONTROLLER

BACKGROUND OF THE INVENTION

1. Field of the Invention

This invention lies in the field of fishing and provides a mechanism for the automatic control of fishing line on a rotating spool during casting. The invention does not apply to irrotational reels for fishing line (commonly called "coffee grinders").

2. Description of the Prior Art

The problem to be addressed by this invention on rotating fishing line spools arises through the accelerations and decelerations of the line on the spool and the spool itself during a cast which tend to result in the originally neatly spooled line which can be easily reeled off the spool becoming hopelessly tangled and jamming up the whole reel of line so that a length period is interposed of struggling to untangle the line before fishing can be resumed.

Not only with newcomers but also with experienced fisherman these tangles, frequently called overwinds, are a well known problem. Despite this tendency for problems the rotating spool is still widely used apparently partly because it still permits very long casts compared to other types, essential, for example, for surf fishing and also because it is very effective in playing a large fish. The experienced fisherman learns to use the thumb to attempt to control the reel but even he or she is subject to occasional overwinds and the resulting tangled line especially at night when it becomes very difficult for even the experienced fisherman to prevent overwinds and tangles. Large numbers of newcomers are daunted by this problem.

Attempts have been made to address this problem by means of mechanisms and devices which are adapted to apply a brake shoe to the spool if the line becomes slack and to lift the brake shoe from the spool when the line is taut. An example is described in S.A. patent 66/5845, manufactured in this country and sold as the "Gillie". The Gillie is a fairly intricate small mechanism which must be mounted on a rotating spool type fishing reel by first dismantling the reel and then reassembling it with the Gillie installed in its various parts. The Gillie has a projecting wire with a large eye at its end through which the line must be threaded before being threaded through the eyes of the rod and thereafter having the sinkers and weights, etc., attached at its end. The Gillie has not come into general use and in fact is very seldom seen if ever, perhaps its largest disadvantage attributing to this is the necessity to dismantle the reel in order to mount the Gillie on it. Whether the device functions effectively is not clear.

A 1968 patent, 68/7120 described a further design based on the general principle of monitoring the line tension to apply a brake to the spool and using a weight instead of a tension spring to pre-load the device into the braking position but this device again would require the reel to be dismantled for it to be mounted and does not appear to have come into use at all.

A 1971 patent, 71/6056 provides a design based on a similar principle but enclosing a coil spring enclosed within a post which is mounted in the reel, again, however, after having to dismantle the reel at least partially. This product again is not seen on the market place.

A 1975 patent, 75/1425 describes still another device broadly using the same principle but again mounted on the fishing reel in a manner which requires disassembly of at least one of the posts of the reel and the loosening of two screws of the reel to attach a mounting bracket. This product again is not seen on the market place.

SUMMARY OF THE INVENTION

A mechanism for the automatic control of a fishing line on a rotating spool fishing reel during casting in accordance with this invention comprises at least one clip adapted to be removably clipped onto a cross bar or bars of a reel, two cranks pivotally connected to the clip at their proximal ends and joined at their longer distal ends by a yoke or eye for the line, the cranks applying at least one brake shoe at the shorter distal end to a rim of the spool and spring means urging the shoe towards the rim.

The automatic control of the fishing line can be visualised as matching or synchronising the speed of take off of line from the reel at all times with the tangential speed of the outer layer of line on the reel.

Preferably, two brake shoes and two springs are provided, each operative about the pivotal connection of the cranks to the clip.

It is a preferred feature of the invention that the clip extends in its gripping formation(s) across the width of the spool from rim to rim, this gives a secure mounting of the device by the clip action and a rigidity of the mounting against any tendencies for torsional disturbances. However, the clip could be divided in two, one to each side and each applying one brake shoe to the spool rim on its side, as a less desirable alternative. The clip itself could be articulated on the cross bar or bars of the reel, this articulation providing for the movement of the yoke and brake shoes. It is furthermore preferably that the brake shoes are easily removable comprising elastic bands hooked onto tabs on the shorter distal ends of the cranks.

BRIEF DESCRIPTION OF THE DRAWINGS

The invention will be more fully described by way of example with reference to the accompanying drawings in which:

FIG. 8 is a side view of what is shown in FIG. 6 with the fishing line taut, FIG. 9 is the similar view with the fishing line slack.

FIG. 10 is a side view of another embodiment.

DESCRIPTION OF THE PREFERRED EMBODIMENTS

Figure 1:
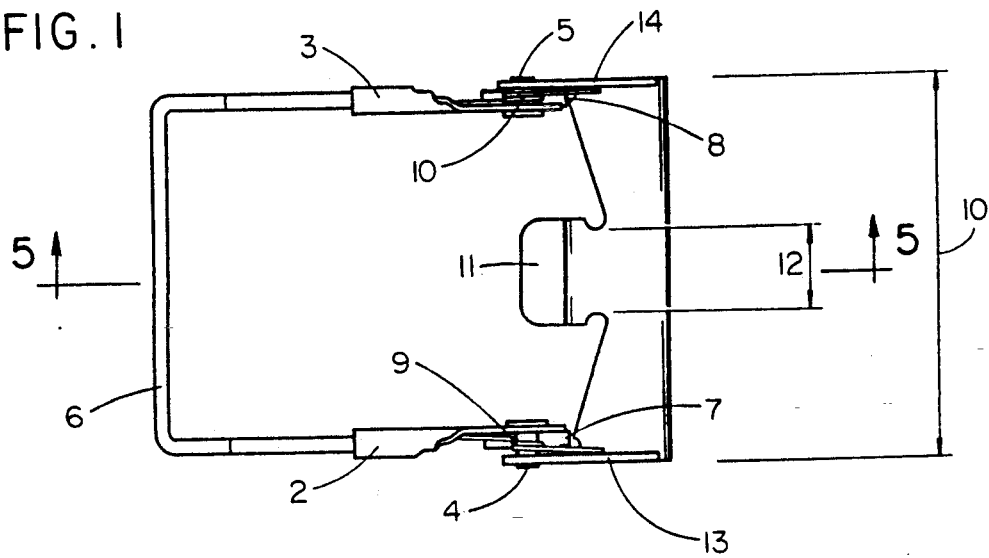
FIG. 1 is a plan view of the mechanism.

As shown in FIGS. 1 to 5 the mechanism for the automatic control of a fishing line on a rotary spool fishing reel during casting comprises a clip 1 which is adapted to be removably clipped on to a cross bar or bars of a reel, two cranks 2 and 3 pivotally connected by pivot pins 4 and 5 to the clip at their proximal ends and joined at their longer distal ends by a yoke 6 for the line, the cranks carrying brake shoes 7 and 8 at their shorter distal ends and spring means in the form of springs 9 and 10.

The clip 1 has a width 10 which allows it to extend across the full width of the fishing reel in use thus providing a torsionally stable mounting and a secure clipping onto the cross bars of the reel. A narrowed portion 11 is provided with a constricted width 12 for spring action by which it clips onto the cross bars of the reel. The ends of the clip 1 are bent into brackets 13 and 14 on which the pins 4 and 5 are located. Each of the cranks 2 and 3 comprises a proximal part 41 and 51 respectively, a longer distal part 42 and 52 respectively and a shorter distal part 43 and 53 respectively. The longer distal parts are joined by a yoke 6. Each of the shorter distal parts have a brake shoe 7 and 8 respectively attached to metal tabs 44 and 45 and 45 and 54 and 55 respectively, the tabs 45 and 55 being somewhat wider than the tabs 44 and 54. Springs 9 and 10 are located around the pins 4 and 5 respectively in between the crank 2 and bracket 13 and crank 3 and bracket 14 respectively. The action of the springs is to tend to pivot the yoke 6 with respect to the clip 1 in the directions indicted by the arrows 15 and 16 about the pivots 4 and 5. The views of FIGS. 1 to 5 show the relative positions of the clip and yoke 6 in which the springs are relaxed.

Figure 2:
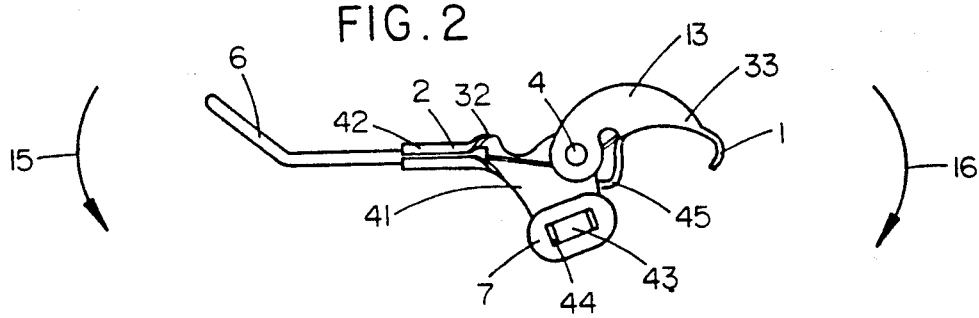
FIG. 2 is a side elevation of the mechanism.
Figure 3:
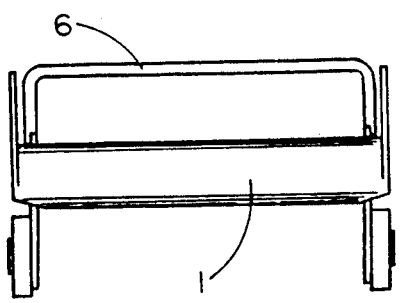
FIG. 3 is a rear view of the mechanism.
Figure 4:
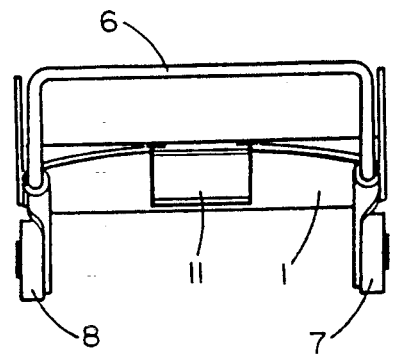
FIG. 4 is a front view of the mechanism.
Figure 5:
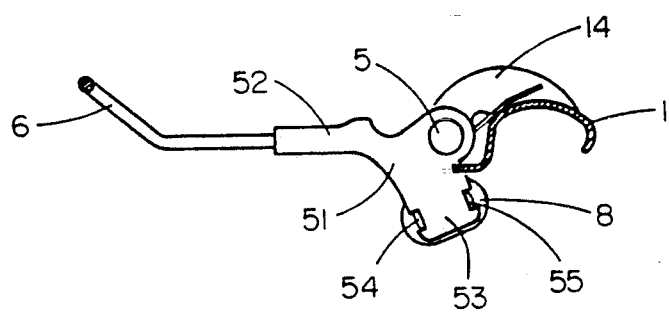
FIG. 5 is a side cross sectional view on section 5—5 in FIG. 1 of the mechanism.

As shown particularly in FIG. 2 the cranks have a horn portion 32 which bears against the surface 33 when the yoke is bent over in an extreme position with respect to the clip in a direction opposite to that shown by the arrow 15. These horn formations function as limit stops for the extreme flexure position. It is best if all the components of the product are made of stainless steel; alternatively they could be made of plastic. The rubber bands 7 and 8 form the brake shoes and are preferably made of silicon rubber cut from surgical tubing, for example; O-rings or another substitute could be used.

Figure 6:
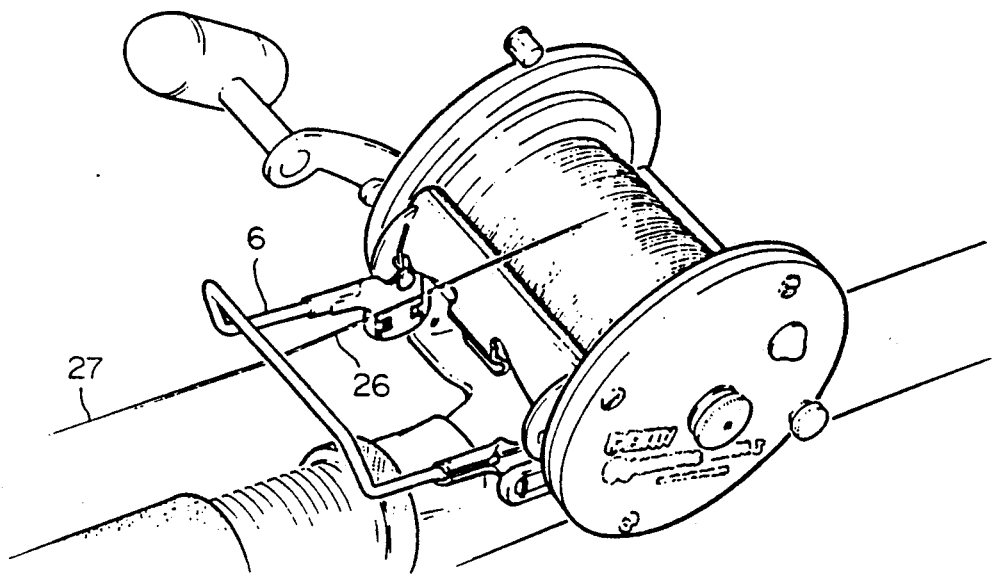
FIG. 6 is a isometric view of the mechanism shown attached to a fishing reel on a rod.
Figure 7:
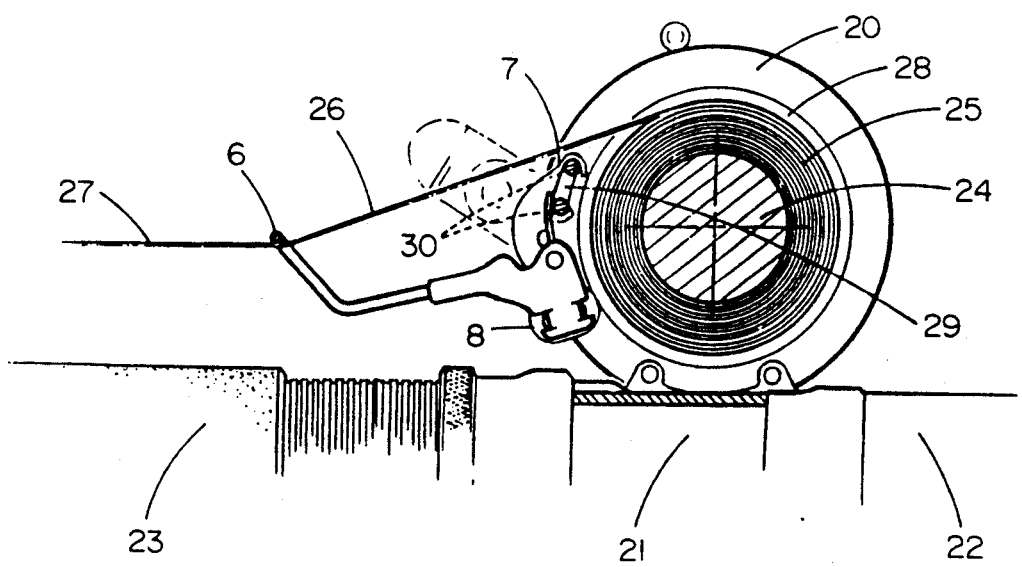
FIG. 7 is a side cross sectional elevation of the device mounted on the reel on a rod.

FIG. 6 shows the device installed on a reel and rod. A reel 20 is mounted in the usual way on a fishing rod 21 of which the handle end is at 22 and the distal end of the rod extends outwardly at 23. The reel 20 has a spool 24 on which the line is wound at 25, the line extending away from the spool at 26, passing underneath the yoke 6 and onwards at 27 to the first eye on the fishing rod. The rim 28 of the reel 24 is shown (there are of course two rims to the spool 24 only one rim 28 being seen in this sectional view). The clip 1 is clipped on to a bar 29 of the reel which extends between the two side cheeks of the reel between which the spool is mounted. In older reels there used to be two round rods shown by the broken lines 30 in place of the bar 29 but the clip 1 is adapted to clip also on these if this is the case. When installed the brake shoes rest on the rims of the spool and in this cross sectional view the brake shoe 8 can be seen resting on the rim 28 under action of the springs. In this position the line of the fishing line takes up the position 26, 27 shown in the drawing that is the line is pulled down by the yoke 6. If the line becomes taut this pulls the yoke 6 upwards and hence the brake shoes off the rims of the spool freeing it and this is the case during the casting. As soon as the sinker, hook and bait hit the water, or slack in the line caused by an uneven cast with the rod, or by speed reduction of the sinker caused by other reasons like strong winds, however, the line slackens and this immediately lets the yoke 6 drop again bringing the brake pads into action on the spool rims again thereby immediately braking the spool and preventing an over-run.

Reference is also made to FIG. 6 which shows the device fitted to a Penn Jigmaster No. 500, a well known proprietary make of rotary spool type reel and fitted on a rod.

FIGS. 8 and 9 show respectively the positions of the fishing line when it is taut and when it is slack, the former being the case where the brake is not applied and the latter where it is applied to the spool. FIGS. 8 and 9 also show the first eye 31 on the rod through which the fishing line 26, 27 is led and, of course, through successive eyes to the end of the rod and thence to the tackle.

As shown in FIG. 10 the elastic bands 7 (and 8 not seen) can be spanned onto rivets 35 and 36 on the shorter distal end 43 and similar rivets (not seen) on the other side shorter distal end 53 (not seen). Other parts are in substance the same and are designated by the reference numerals used in the description of previous figures.

We claim:

1. A mechanism for automatic control of a fishing line on a rotating spool fishing reel having a first side which faces the direction in which the line extends away from the spool during casting and at least one cross member located on the first side, the spool having rims, said mechanism incorporating a spring action clip removably clipped non-rotationally onto the cross member, two cranks each incorporating a longer and a shorter distal end and a common middle, said cranks being pivotally connected at their middles to said clip and joined at their longer distal ends by a yoke for the line, at least one of the shorter distal ends carrying a brake shoe, said cranks being adapted to apply the brake shoe to the corresponding rim of the spool, and spring means biasing said cranks in a direction relative to said clip to swing the shoe towards said corresponding rim, the line extending away from the spool being deflected by and passing underneath the yoke and adapted to displace the yoke upward against the biasing action of said spring means and hence displace said brake shoe off said corresponding rim when the line becomes taut.

2. A mechanism as claimed in claim 1, in which a tab is provided on at least one of said shorter distal ends, said brake shoe comprising an elastic band hooked onto the corresponding tab in a manner which is easily removable.

3. A mechanism as claimed in claim 2, in which the cranks are formed of pressed sheet metal and the yoke of bent wire, in which the tabs are bent from the sheet metal, bent inwardly, two on each crank, one tab being longer than the other tab on each crank, the longer tab being adapted to bear the elastic band against the spool rim.

4. A mechanism as claimed in claim 1, in which the cranks are provided with horns engageable with said clip to limit angular displacement of said cranks against the biasing action of said spring means.

5. A mechanism as claimed in claim 1, in which the clip is formed from pressed sheet metal having a narrowed portion, only, for spring clip engagement on to said bar.

6. A mechanism as claimed in claim 1, in which the cranks each have two rivets located at the corresponding middle and in which a brake shoe is provided on each crank and comprises an elastic band hooked onto the two rivets on the corresponding crank in an easily removable way.

* * * * *